United States Patent
Merla et al.

(10) Patent No.: US 8,104,228 B2
(45) Date of Patent: Jan. 31, 2012

(54) GASKET FOR REFRIGERATOR CABINETS WITH HIGH HEAT INSULATION PROPERTIES

(75) Inventors: Adriano Merla, Angera (IT); Pier Paolo Ferrante, Cuvio (IT); Mauro Guido Mentasti, Malnate (IT)

(73) Assignee: Industrie Ilpea S.p.A., Malgesso (IT)

( * ) Notice: Subject to any disclaimer, the term of this patent is extended or adjusted under 35 U.S.C. 154(b) by 499 days.

(21) Appl. No.: 11/883,322

(22) PCT Filed: Jan. 26, 2006

(86) PCT No.: PCT/EP2006/050475
§ 371 (c)(1),
(2), (4) Date: Jul. 30, 2007

(87) PCT Pub. No.: WO2006/079650
PCT Pub. Date: Aug. 3, 2006

(65) Prior Publication Data
US 2008/0307710 A1    Dec. 18, 2008

(30) Foreign Application Priority Data
Jan. 28, 2005  (IT) .............................. MI2005A0121

(51) Int. Cl.
*E06B 7/16* (2006.01)
(52) U.S. Cl. ..................................... 49/478.1; 49/475.1
(58) Field of Classification Search .................. 49/478.1, 49/475.1
See application file for complete search history.

(56) References Cited

U.S. PATENT DOCUMENTS

| | | | |
|---|---|---|---|
| 2,700,194 A | | 1/1955 | Rasmussen |
| 3,289,352 A * | | 12/1966 | Heilweil et al. ............. 49/478.1 |
| 4,305,230 A * | | 12/1981 | Gerritsen ..................... 49/478.1 |
| 4,617,759 A * | | 10/1986 | Pasqualini et al. ........... 49/478.1 |
| 5,289,657 A * | | 3/1994 | Kiel .............. 49/478.1 |
| 5,476,318 A * | | 12/1995 | Yingst et al. .................. 312/405 |
| 5,916,076 A * | | 6/1999 | Cittadini et al. ............. 49/492.1 |
| 6,227,634 B1 * | | 5/2001 | Cittadini et al. ............. 312/296 |
| 7,219,471 B2 * | | 5/2007 | Cittadini et al. ............. 49/478.1 |
| 2003/0019159 A1* | | 1/2003 | Holmqvist .................... 49/478.1 |
| 2009/0058246 A1* | | 3/2009 | Cittadini et al. ............. 312/405 |

FOREIGN PATENT DOCUMENTS

| | | |
|---|---|---|
| DE | 92 11 008.8 | 1/1993 |
| EP | 0146994 | 7/1985 |
| EP | 0 152 989 | 8/1985 |
| EP | 0319087 | 6/1989 |
| WO | 02/070971 | 9/2002 |

* cited by examiner

*Primary Examiner* — Gregory J. Strimbu
(74) *Attorney, Agent, or Firm* — Jacobson Holman PLLC

(57) ABSTRACT

Gasket for a refrigerator cabinet having a base portion and a soft bellows portion. The base portion of the gasket is designed to couple with an outer door portion and an inner door portion of a door of the refrigerator cabinet before final filling of the shell defined by the outer door portion and inner door portion with a heat insulating material. The base portion has an inverted U shape, delimited by essentially vertical sections and a horizontal section. The vertical sections each terminate with a foot for resting on the door.

7 Claims, 8 Drawing Sheets

GASKET FOR REFRIGERATOR CABINETS WITH HIGH HEAT INSULATION PROPERTIES

This is a national stage of PCT/EP2006/050475 filed 26 Jan. 2006 and published in English.

BACKGROUND OF THE INVENTION

1. Field of the Invention

This invention refers to a gasket for refrigerator cabinets of the type comprising a soft bellows type portion for tight sealing and a base portion designed to fit against the outer door and inner door of the refrigerator cabinet before final filling with a heat insulating material of the shell formed by the outer door and inner door.

2. Description of the Related Art

Gaskets of this type are, for example, described in EP 146994 and EP 319087 of the same Applicant.

The heat insulating material, for example a polyurethane foam, is usually injected in the shell formed by the outer door and inner door and hermetically sealed by the gasket, applied in fluid form, therefore able to flow and completely fill the space available before hardening, thereby forming a single compact block.

SUMMARY OF THE INVENTION

In relation to said known tight sealing systems, this invention aims to considerably improve the thermal performance of the refrigeration appliance, decreasing energy consumption through a drastic reduction in the transmission of heat between the outside and the colder inside that may occur along the entire perimetral zone of closing between the door and cabinet.

According to the aims of this invention, it is desired preferably that manufacturers of refrigerators that use profiles, both mono-extruded or co-extruded such as those described in the patents mentioned previously, can obtain said effect of improved thermal performance without modifying the production processes and equipment, such as the foaming molds already used.

To achieve said aims and other advantages that will be described below, this invention proposes a gasket for refrigerator cabinets of the type comprising a soft bellows type portion able to provide tight sealing and a base portion designed to fit against the outer door and inner door of the refrigerator cabinet before final filling with a heat insulating material of the shell formed by the outer door and inner door, a coupling plane with said base portion of the gasket being identified on said outer door, characterized by the fact that said base portion is of inverted U shape delimited by essentially vertical sections of which that operationally external terminates with a foot resting on said coupling plane, and by a horizontal section of the said U that is operationally offset and essentially protruding in relation to said resting foot, said U-shaped section thereby forming a chamber able to accommodate said heat insulating material which forms, at the position of said chamber, a perimetral projection of heat insulating material essentially protruding in the direction of the cabinet with respect to said resting foot.

In an embodiment preferred by refrigerator manufacturers, the outer door and inner door are essentially aligned at the position of said coupling plane and said base portion is of inverted U shape in which the horizontal section of the U is in this way operationally offset and essentially protruding in relation to said foot resting on said coupling plane and, therefore, in relation to said plane of alignment between the outer door and inner door. In this case, the essentially vertical sections of the U-shaped section are essentially of equal length.

In other embodiments, there may be no alignment between the outer door and inner door; in this case, the essentially vertical sections of the U-shaped section will be of different length.

Said base portion must have adequate stiffness characteristics, these being provided for example by the material or the mix of materials of which it is made, via its own intrinsic characteristics of stiffness, or via dimensioning thereof with, for example, sufficient thickness.

BRIEF DESCRIPTION OF THE DRAWINGS

In order to better understand the characteristics and advantages of the invention, examples; not intended to be restrictive, of practical application are described below referring to the figures of the attached drawings.

All the above views are schematic.

DETAILED DESCRIPTION OF THE PREFERRED EMBODIMENTS

With reference to said drawings, a gasket 10 of the invention includes a bellows portion 11 made of soft material, such as plasticized PVC or similar, co-extruded with a base portion 12 in material such as rigid PVC. Suitable alternative materials are, for example, thermoplastic elastomers belonging to the families of the TPE-O and TPE-S for the soft parts and PP and its copolymers for the rigid part.

Figure 1:
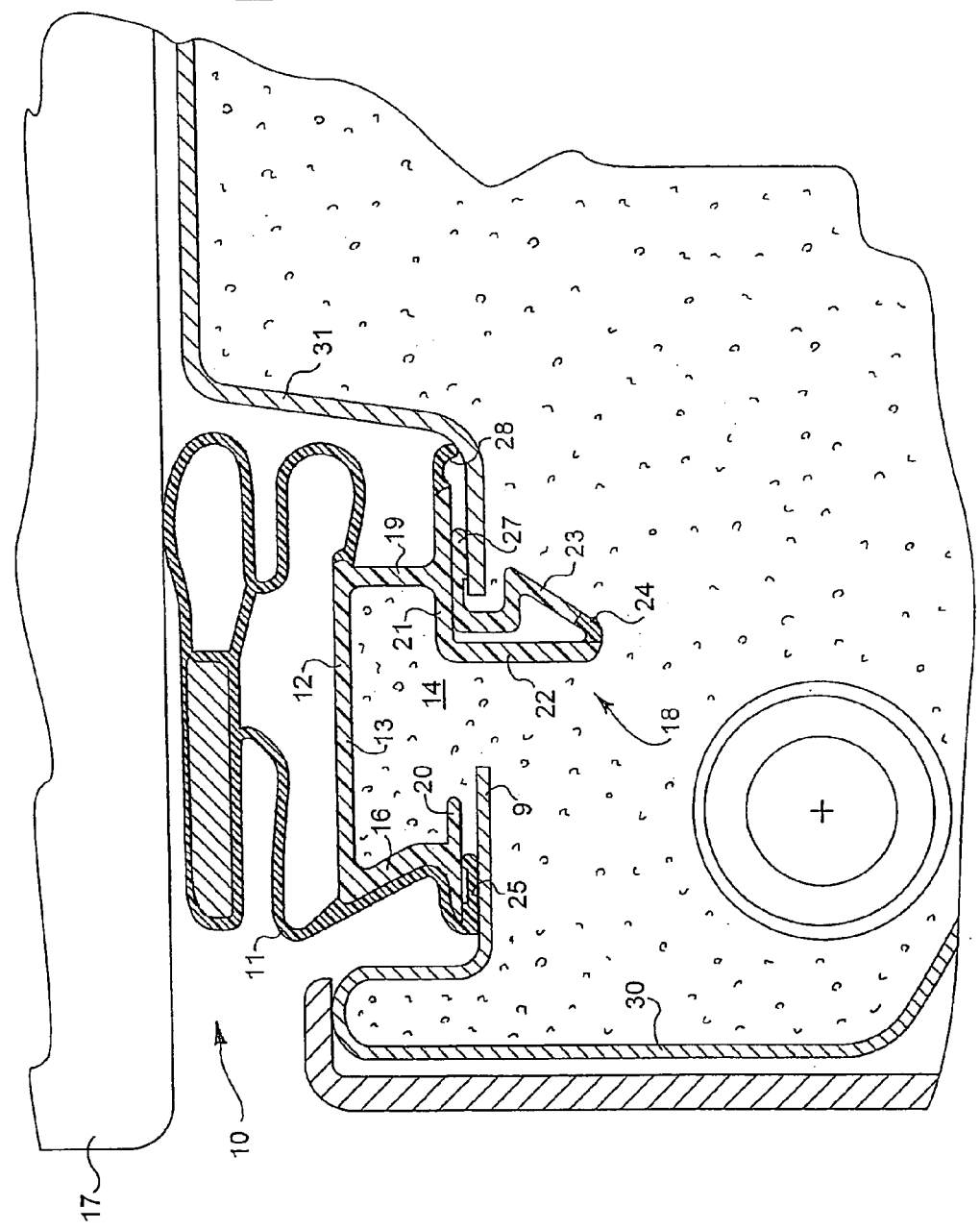
FIG. 1 is a cross-section view of a gasket according to the invention, of magnetic type, operationally applied to the door of a refrigerator.
Figure 3:
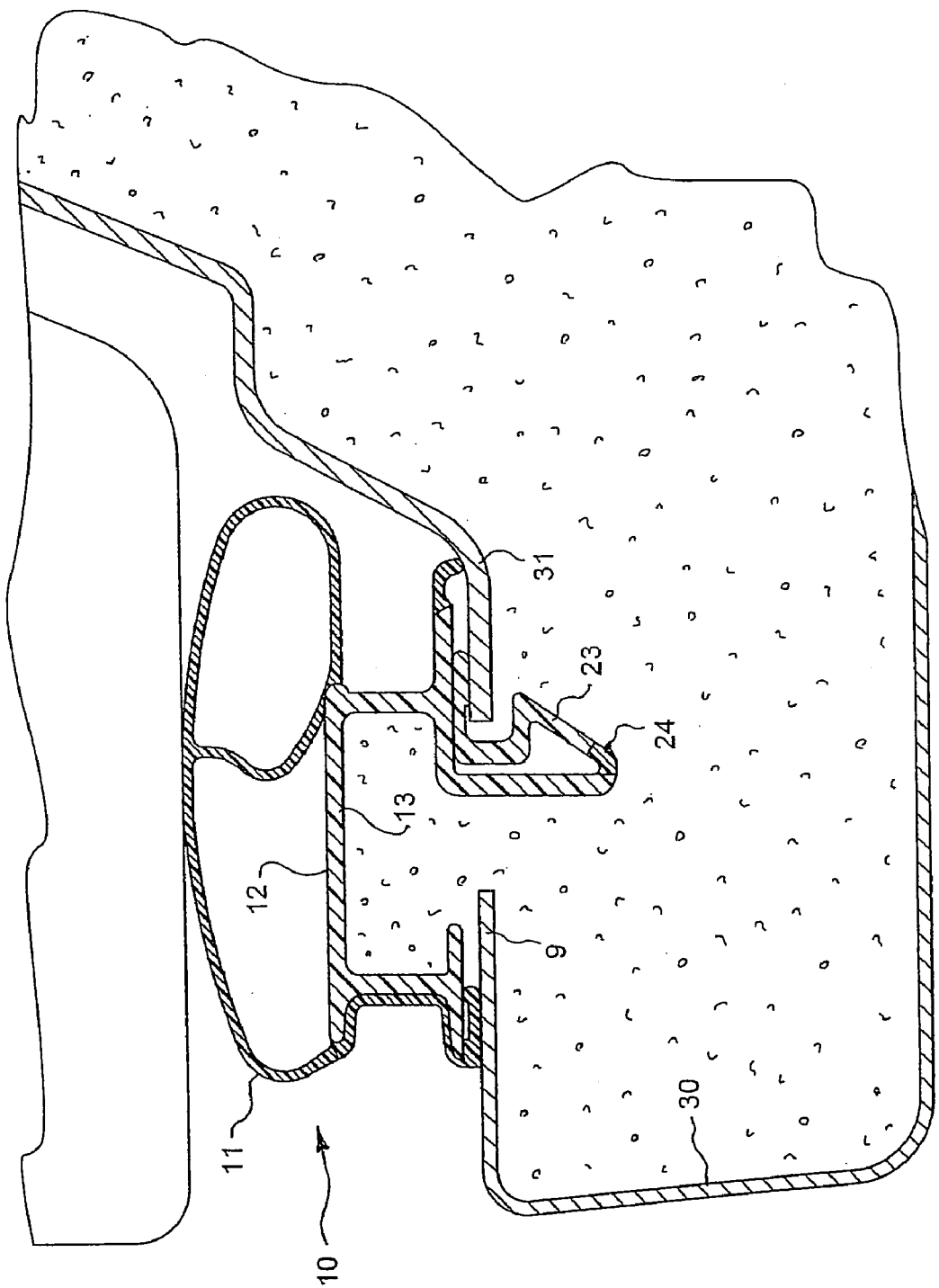
FIG. 3 is a cross-section view of a gasket according to the invention, of non-magnetic type, operationally applied to the door of a refrigerator.

The bellows portion 11 may be of magnetic type as in the embodiment of FIG. 1 or of non-magnetic type as in the embodiment of FIG. 3, this latter variant being particularly suitable in the case of horizontal freezers.

Figure 2:
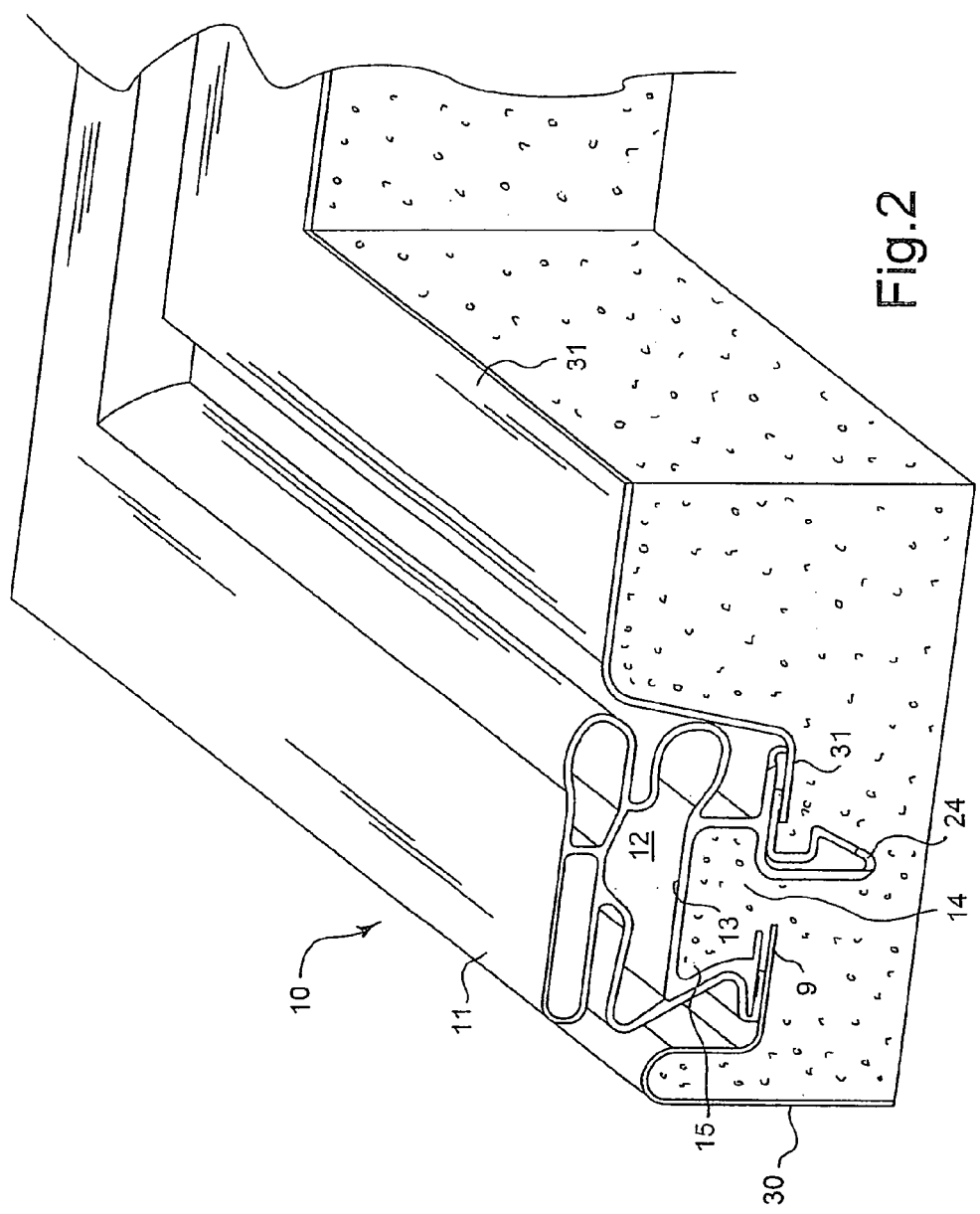
FIG. 2 is a prospect view of the gasket as shown in FIG. 1.

In the embodiments of FIGS. 1, 2, 3 said base portion 12 of a gasket 10 is of inverted U shape formed by a horizontal section 13 and a pair of essentially vertical sections, one operationally external 16 for coupling with an outer door 30, made of bent sheet metal terminating with a plane 9, and one operationally internal 19 for coupling with an inner door 31. For said purpose, said section 16 terminates with a foot 20 for resting on the coupling plane 9 on the outer door 30, while said section 19 terminates with a foot 21 from the inside of which a vertical section 22 extends fitted with snap fastening means 23, activated by an elbow 24 made of soft material, on the end of the inner door 31, as for example described in EP 146994 and EP 319087 of the same Applicant.

In the gasket 10, the soft material of the portion 11 is co-extruded with the rigid base portion 12 along the entire extension of the section 16 and terminates with a sealing lip 25 designed to fit operationally against the plane 9 of the outer door 30 to prevent leakage of the heat insulating material in the final filling phase. For said sealing purposes, further lips co-extruded in soft materials are provided, i.e. 27 on said fastening means 23, and 28 on said foot 21 of the base of the gasket.

In the gasket 10, the soft material of the portion 11 is co-extruded with the rigid portion 12 along the entire extension of the section 16 and terminates with a sealing lip 25 designed to fit operationally against the plane 9 of the outer door 30 to prevent leakage of the heat insulating material in the final filling phase. For said sealing purposes, further lips co-extruded in soft materials are provided, i.e. 27 on said fastening means 23, and 28 on said foot 21 of the base of the gasket.

Figure 4:
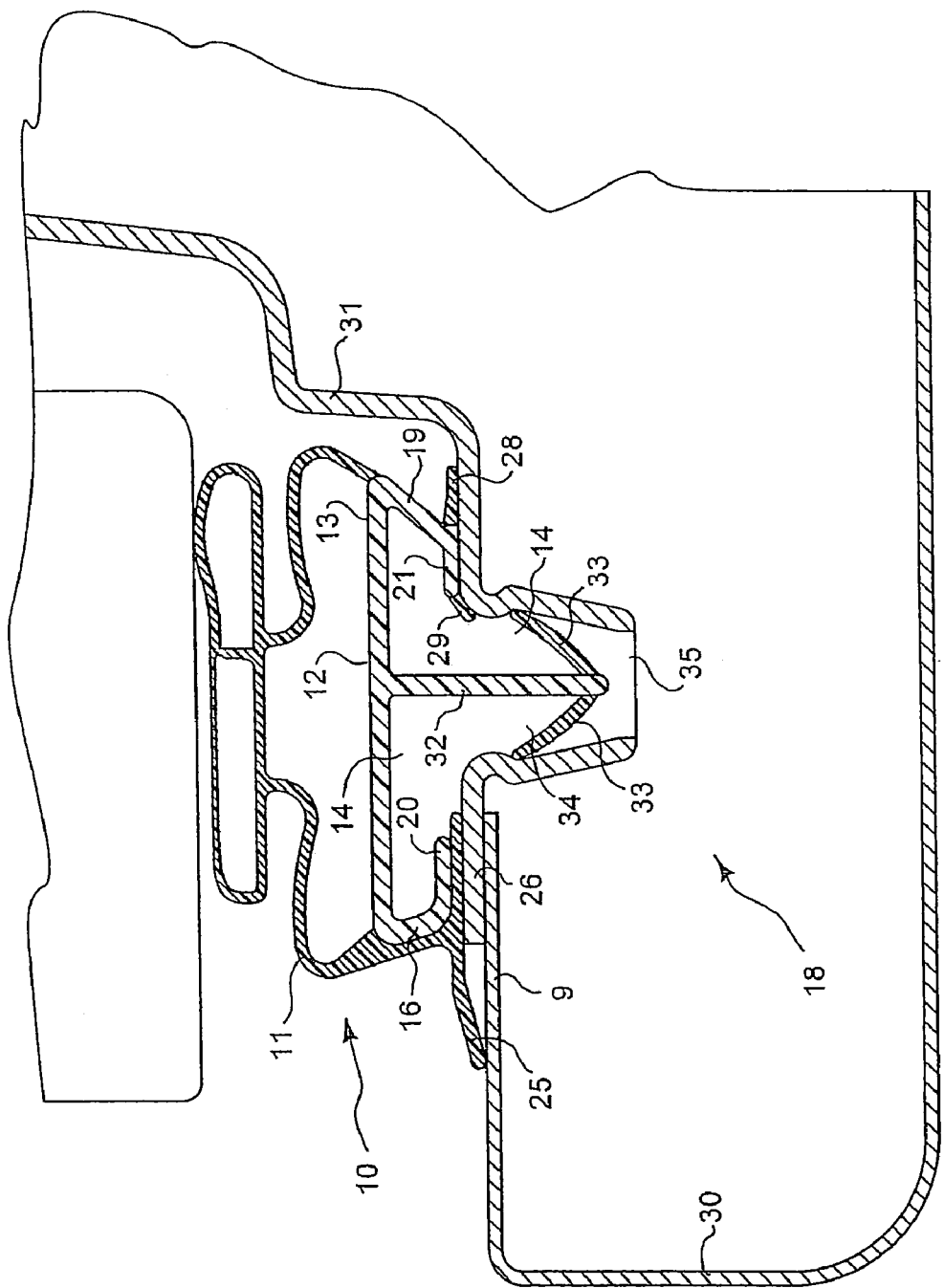
FIG. 4 is a cross-section view of a variant of the gasket according to the invention, operationally applied to the door of a refrigerator before final filling of the shell formed by the outer door and inner door with a heat insulating material.
Figure 5:
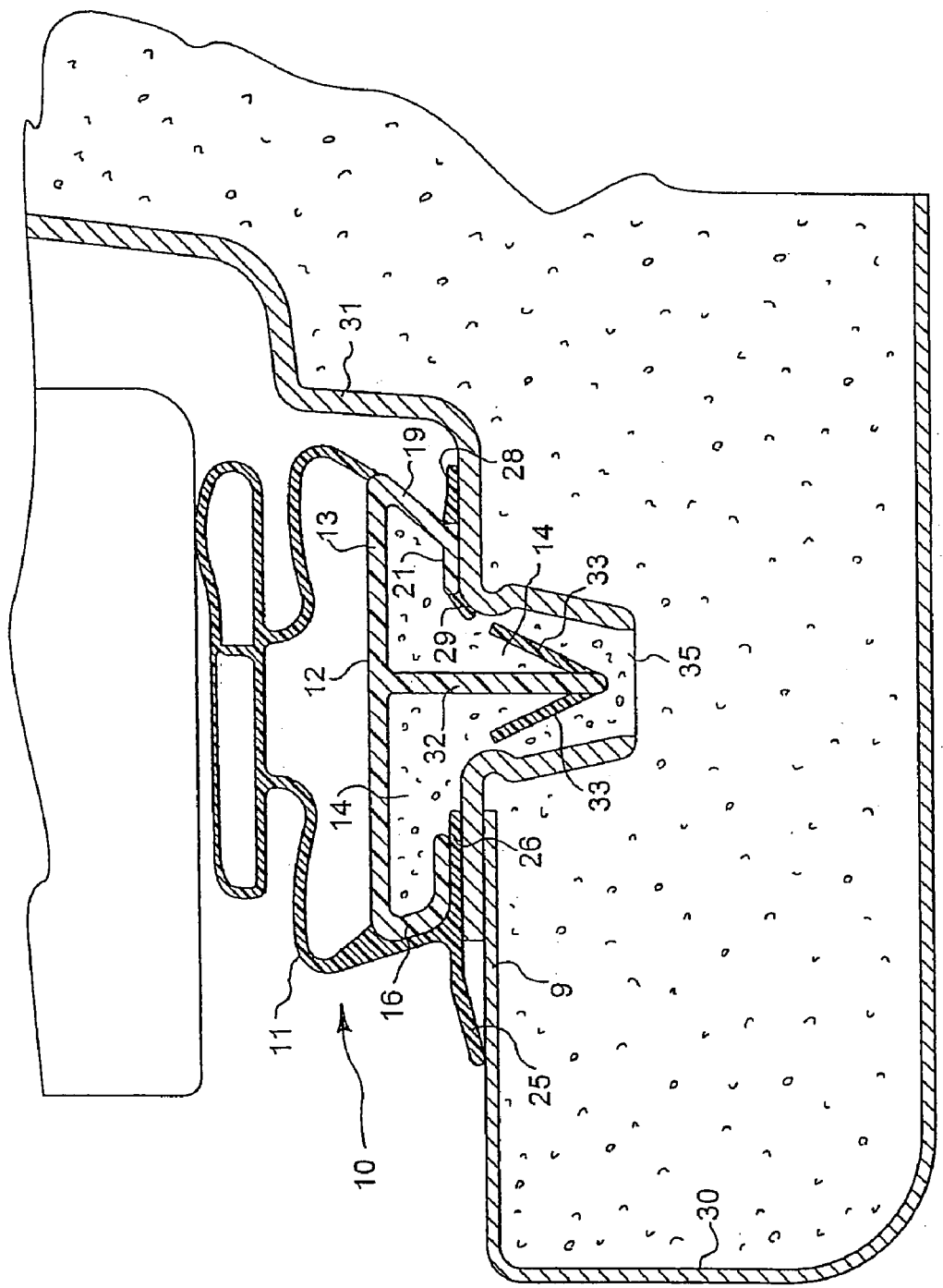
FIG. 5 is a view of FIG. 4 after the final filling phase with a heat insulating material of the shell formed by the outer door and inner door.

In the embodiment illustrated in FIGS. 4 and 5, the gasket 10 has a base portion 12 in which, from the horizontal section 13 of the inverted U formed with the essentially vertical sections 16 and 19, a vertical section 32 extends in the direction of the inner door terminating with a pair of sealing lips 33 co-extruded in soft material. This structure comprises fastening means on the inner door 31, shaped for said purpose as a hollow housing 34 to accommodate the vertical section 32 and to couple in a stable manner with this due to the effect of the soft lips 33 that, while bending, form a seal against the walls of said hollow housing 34. In said embodiment, to allow the filling of the chamber 14 of the gasket with the heat insulating material during the final foaming phase, the inner door 31 is provided along the hollow housing 34 with a sufficient number of passageways 35 of suitable dimensions able to permit access of the heat insulating material in the foaming phase. These passageways 35 may be formed below in the said hollow housing as shown in FIGS. 4 and 5, or at the side thereof.

Also in said embodiment, in the gasket 10 the soft material of the portion 11 is co-extruded with the rigid material of the portion 12 along the entire extension of the section 16 and terminates with a sealing lip 25 able to fit against the plane 9 of the outer door 30 to prevent leakage of the heat insulating material in the final filling phase. The resting feet 20 and 21 of said essentially vertical sections 16 and 19 have soft co-extruded sealing lips, respectively 25 on 16, and 28 and 29 on 19, for the heat insulating material.

Figure 6:
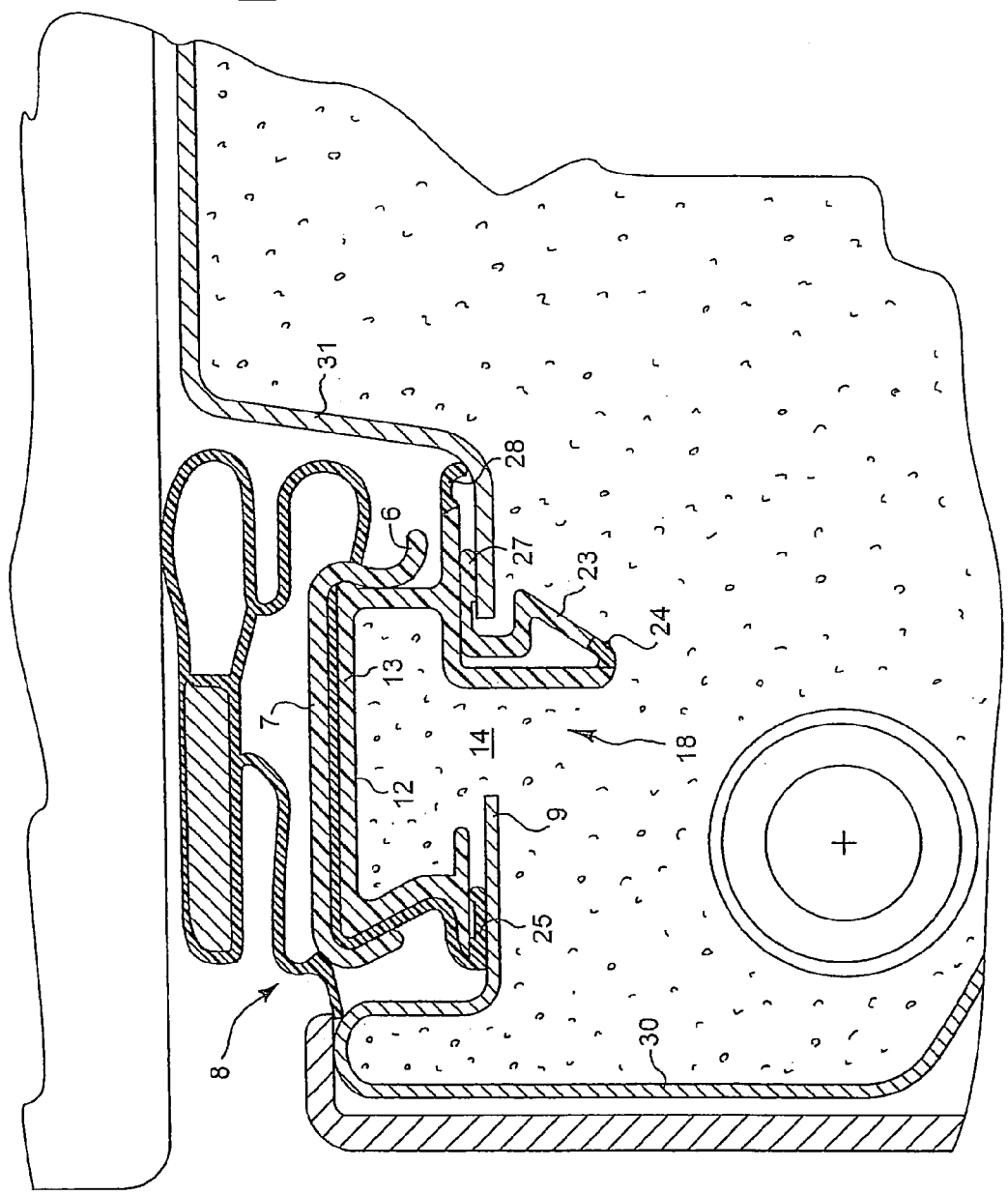
FIG. 6 is the gasket of FIG. 1 to which a spare gasket has been applied to replace the original gasket.

FIG. 6 shows the gasket of FIG. 1 to which a co-extruded spare gasket 8 has been applied to replace the original soft portion 11 that, once worn, is removed tearing it along the section 12 of the rigid base 13, conveniently along dotted breakage points. The co-extruded spare gasket 8 includes a soft bellows identical to that replaced and a rigid portion 7 for fastening on the base portion 12 of the gasket, in relation to which it is shaped with a complementary U-shaped section, with curved side wall 6 so as to facilitate stable fastening due to interference with the base 12.

In variants of embodiment, said spare gasket may be fastened on the base 12 of the original gasket using other systems, such as adhesive, double-sided adhesive, velcro, and similar.

Figure 7:
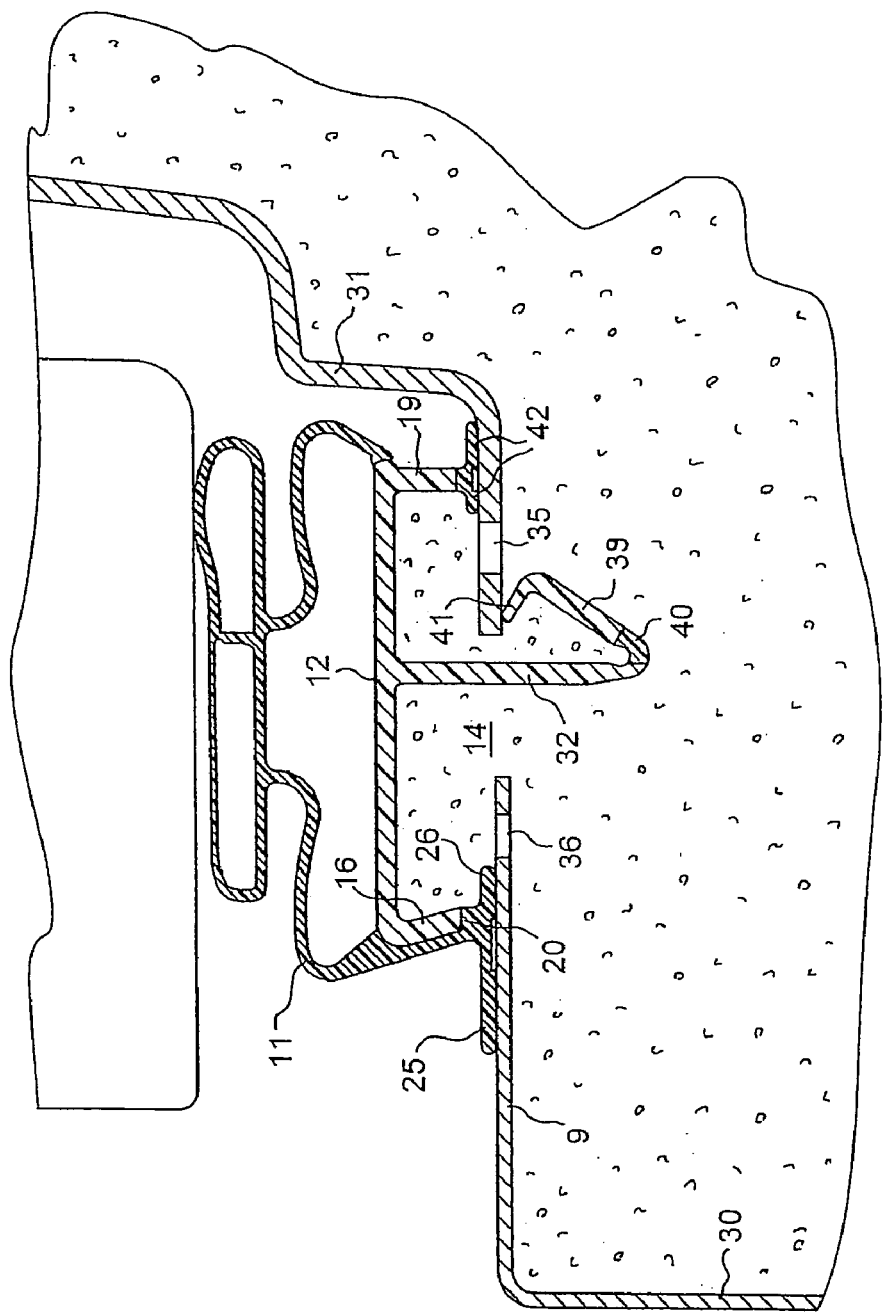
FIG. 7 is a cross-section view of a further variant of the gasket.

The embodiment of the gasket according to the invention shown in FIG. 7 is not dissimilar from a structural point of view from that of FIG. 4. In this case however the inner door 31 is not shaped in the form of a hollow housing: fastening of the base portion 12 of the gasket 10 on the end of the inner door 31 is achieved by means of a vertical section 32 that extends in the direction of the inner door with a mobile arm 39 that bends due to the effect of an elbow 40 in soft co-extruded material, terminating with a soft sealing lip 41, also co-extruded. The vertical section 19 of the base 12 that rests on the inner door 31 terminates with a pair of sealing lips 42, while the foot 20 of the external vertical section 16 is fitted with a sealing lip 25 similarly to the aforementioned embodiment of FIG. 4, and with a further sealing lip 26.

In the case of FIG. 7, the fluid polyurethane foam may flow into the chamber 14 and also into the empty spaces at the position of the vertical section 32 also through passageways 35 obtained along the inner door 31, or 36 along the plane 9 of the outer door 30.

Figure 8:
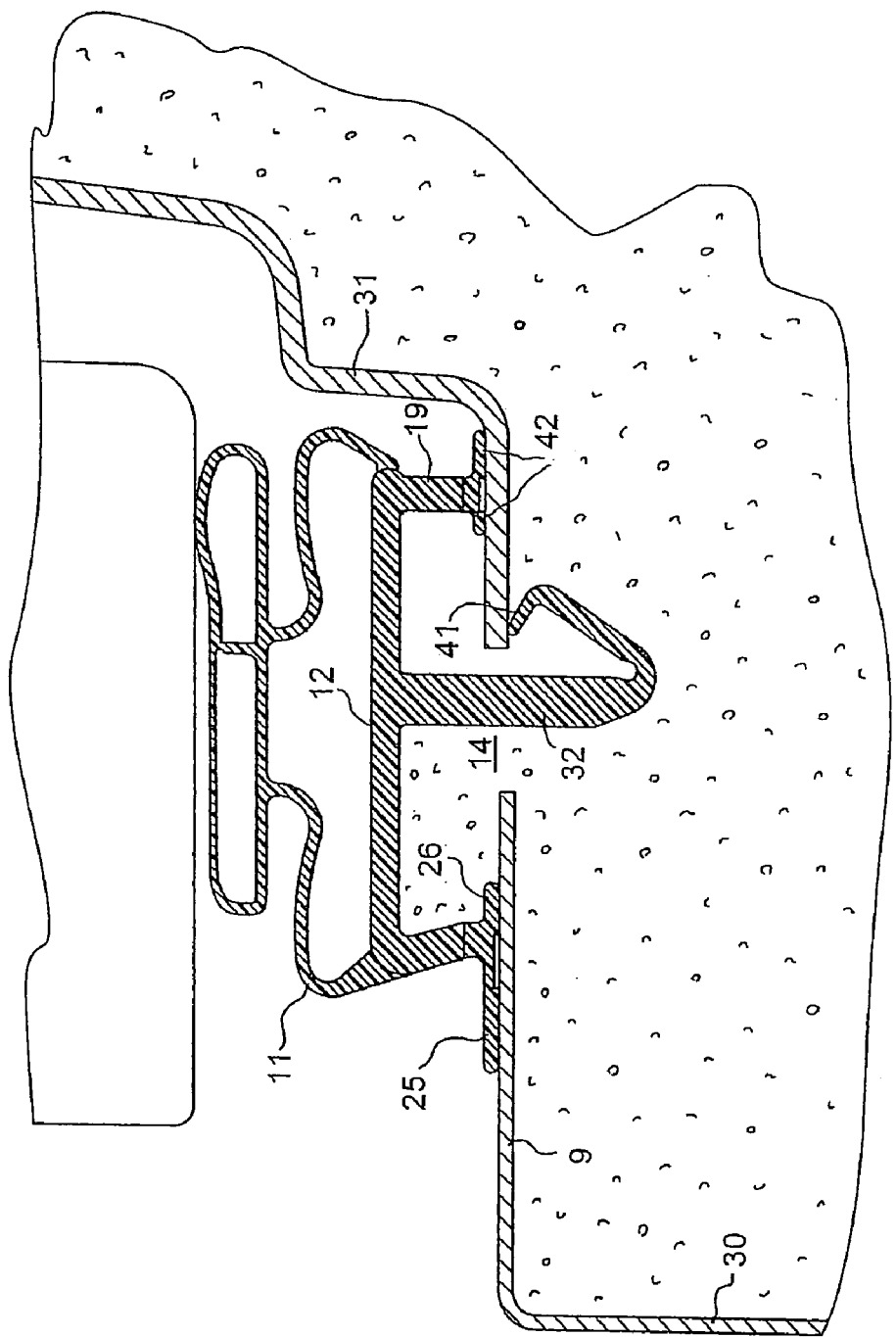
FIG. 8 is a cross-section view of a variant of the gasket according to the invention of mono-extruded type, i.e. extruded in a single material.

The embodiment of the gasket 10 according to the invention shown in FIG. 8 is structurally similar to that of FIG. 7 but is made by extrusion in a single soft material (i.e. mono-extruded) of the type used for the bellows portion 11, suitably increasing the thickness of the base portion 12 so as to endow the latter with sufficient stiffness by said increased thickness on the vertical sections 16 and 19 on the horizontal section 13. In this case, the bending movement of the arm 39 for resting on the inner door 31 is obtained by reducing the thickness of the elbow 40. Similar mono-extruded variants of the gasket according to the invention with different thickness are also provided for structures similar to that of the embodiment shown in FIG. 1.

In any embodiment, the gasket 10 of the invention is able to couple with the outer door 30 and the inner door 31 before the final filling phase with a heat insulating material of the shell 18 formed by the outer door and inner door. Therefore, once welded at the corners in the form of a continuous frame, it is supplied ready for assembly to the outer door and inner door in the manner described in EP 319087 of the same Applicant, placing it in the operating position shown for example in FIG. 4, and then proceeding with filling with a heat insulating material, for example polyurethane foam, of the closed shell 18 formed by the assembled gasket, outer door and inner door. In said operating position, in said base portion 12 of inverted U shape, the horizontal section 13 of the U is operationally offset and basically protruding in relation to said resting foot 20, said U-shaped section thereby defining a chamber 14 able to accommodate part of said heat insulating material. The latter is then fed into the closed shell 18, for example injecting polyurethane foam, thereby completely filling it, chamber 14 included, while said lips 25, 27 and 28 prevent leakage from the assembled system.

Once filling with foam has been completed, as for example shown in FIGS. 1, 2, 3, 5, said chamber 14 of the gasket 10 welded to form a frame, now definitively incorporated between the outer door and inner door by the block of hardened heat insulating material, forms a continuous perimetral projection 15 of heat insulating material essentially protruding in the direction of the cabinet 17 with respect to said foot 20 of the gasket resting on the outer door 30.

In the embodiments shown in the figure, the outer door 30 and inner door 31 are essentially aligned at the position of said coupling plane 9 so that in said inverted U-shaped section the horizontal section 13 of the U is operationally offset and essentially protruding with respect to said resting foot 20 and in relation to said plane of alignment between the outer door and inner door, more or less coinciding with said plane 9. Offsetting of alignment between the two planes of the outer door and inner door does not modify the technical effect produced by the invention as this requires essentially that the horizontal section of the U-shaped section of the base of the gasket be operationally offset and basically protruding with respect to said foot 20 of the base resting on the outer door 30. According to the invention, the term essentially protruding means, preferably but not restricted to, that in said inverted U-shaped section the horizontal section of the U protrudes from said foot 20 of the base resting on the outer door for a distance of between approx. at least a quarter of the distance between said foot 20 and the line of contact with the cabinet 17, up to a maximum distance corresponding to the space remaining between the horizontal section of the base and the cabinet such as to permit functionality of the bellows of the gasket.

Also, in the said inverted U-shaped section defined by a horizontal section and a pair of essentially vertical sections, essentially vertical sections means that they may be either perpendicular to said horizontal section, such as 19 in FIG. 1, or even oblique such as 16 in FIG. 1.

The technical effect according to the invention consists in the fact that the perimetral projection of the heat insulating material essentially protruding in the direction of the cabinet with respect to said coupling plane between the gasket and outer door forms a continuous heat-insulating barrier that occupies a conspicuous part of the space between the outer door and the cabinet of the refrigerator in which it is projected. For example, but not restricted to, suppose in the project the distance between the refrigerator cabinet and the coupling plane with the gasket on the outer door is 16 mm, and with a known type of gasket, the quota of said distance not occupied by heat insulating material is more or less the same, representing a volume of air trapped in the gasket through which heat exchange with the external environment is possible. With the gasket of the invention, while maintaining said distance of 16 mm generally unchanged, the quantity of space with trapped air not occupied by heat insulating material is reduced to around only 8 mm, thereby obtaining a drastic reduction in the transmission of heat between the outside and the colder inside, and therefore promoting higher performance of the refrigerator, i.e. a reduction in consumption that can be quantified as 5-10% (estimated through software mathematical simulation).

This noteworthy advantage is preferably obtained by the manufacturer of the refrigerator without modifying any aspect of the project of the model of refrigerator concerned, therefore using the same equipment and production procedures already adopted as the new technical effect is restricted to the space occupied by the gasket only, through modification of its structure but not of its overall dimensions.

The final rigid planar structure of the assembly comprising the outer door inner door/gasket of the invention, arranged parallel to the work plane, in the final filling phase with heat insulating material also represents a further advantage for the manufacturer of the refrigerator in terms of dimensional and structural stability of the door.

The invention claimed is:

1. A gasket for a refrigerator cabinet, said gasket comprising:
   a bellows portion for sealing between the refrigerator cabinet and a door, the door including an outer door portion and an inner door portion defining a coupling plane and forming a shell to be filled with a heat insulating material,
   a base portion for fitting against the outer door portion and the inner door portion,
   said base portion having a U shape delimited by two generally vertical sections and a horizontal section, the horizontal section being generally planar between distal ends of the horizontal section, the bellows portion being mounted on the horizontal section, one of the two vertical sections being attached at a first end to the horizontal section and terminating at a second end thereof with a foot integral with the second end, the foot being spaced from the coupling plane by sealing means for retaining the heat insulating material, and
   the horizontal section of the base portion being offset and substantially protruding with respect to said foot, said U-shaped base portion thus forming a chamber to accommodate said heat insulating material as a perimetral projection of heat insulating material protruding from the coupling plane towards the refrigerator cabinet,
   wherein the base portion and the foot are harder than the bellows portion.

2. The gasket according to claim 1, wherein the outer door portion and inner door portion are essentially aligned along said coupling plane and the vertical sections of the U-shaped base portion protrude from the horizontal section essentially an equal distance.

3. The gasket according to claim 1, wherein the other one of the two vertical sections terminates with a second foot having a third vertical section extending therefrom, said third vertical section includes a snap fastener attached thereto via an elbow.

4. The gasket according to claim 3, wherein said second foot and said snap fastener each include a seal for retaining the heat insulating material.

5. The gasket according to claim 1, wherein from said horizontal section of the U-shaped base portion, a vertical portion extends and includes lips which engage a hollow portion of the inner door portion, said hollow portion including a passageway for access of the heat insulating material to said chamber.

6. The gasket according to claim 5, wherein the other one of the two vertical sections of the U-shaped base portion includes a foot fitted with a seal for retaining said heat insulating material.

7. The gasket according to claim 1, wherein the gasket is made of a single material and said base portion has a greater thickness that a thickness of said bellows portion.

\* \* \* \* \*